US008619270B2

(12) United States Patent
Fukasawa

(10) Patent No.: US 8,619,270 B2
(45) Date of Patent: Dec. 31, 2013

(54) DOUBLE-SIDE RECORDING APPARATUS AND RECORDING METHOD

(75) Inventor: Jun Fukasawa, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 1556 days.

(21) Appl. No.: 11/901,312

(22) Filed: Sep. 17, 2007

(65) Prior Publication Data

US 2008/0068632 A1 Mar. 20, 2008

(30) Foreign Application Priority Data

Sep. 15, 2006 (JP) ................................ 2006-251521

(51) Int. Cl.
*G06K 15/00* (2006.01)
*B41J 29/38* (2006.01)

(52) U.S. Cl.
USPC .................. 358/1.12; 347/5; 347/16; 347/22; 347/29

(58) Field of Classification Search
USPC ........................................................ 358/1.12
See application file for complete search history.

(56) References Cited

U.S. PATENT DOCUMENTS

| | | | | |
|---|---|---|---|---|
| 6,145,955 A * | 11/2000 | Yamaguchi | ..................... | 347/29 |
| 2002/0005873 A1* | 1/2002 | Suzuki | ............................ | 347/27 |
| 2004/0095406 A1* | 5/2004 | Uchida | ........................... | 347/16 |
| 2005/0052485 A1* | 3/2005 | Komatsu et al. | ................ | 347/17 |

FOREIGN PATENT DOCUMENTS

| | | |
|---|---|---|
| JP | 05-169668 | 7/1993 |
| JP | 08-336989 | 12/1996 |
| JP | 2003-053947 | 2/2003 |
| JP | 2004-314505 | 11/2004 |
| JP | 2006-188068 | 7/2006 |

* cited by examiner

*Primary Examiner* — Huo Long Chen
(74) *Attorney, Agent, or Firm* — Nutter McClennen & Fish LLP; John J. Penny, Jr.; Michael P. Visconti, III

(57) ABSTRACT

A double-side recording apparatus includes a recording section that performs recording by ejecting liquid to a sheet-shaped medium; a reversing section that reverses the medium after recording on one side of the medium; a capping section of the recording section; a moving section that moves the recording section to a second position where the recording section is capped and a first position other than the second position; and a controller that controls the moving section and the capping section. The controller determines whether a waiting time set to cause recording to wait for drying exceeds a threshold value before a reversing operation by the reversing section is initiated after recording on the one side of the medium is completed. After the recording section completes recording on the one side of the medium, the controller controls the recording section to wait at the first position without moving the recording section to the second position when the waiting time does not exceed the threshold value, and controls the recording section to wait in a capping state by moving the recording section to the second position when the waiting time exceeds the threshold value.

4 Claims, 5 Drawing Sheets

DOUBLE-SIDE RECORDING APPARATUS AND RECORDING METHOD

BACKGROUND

1. Technical Field

The present invention relates to a double-side recording apparatus and recording method for transporting a medium and performing recording on both sides of the transported medium, and more particularly to a technique of waiting for drying of a recorded portion when a medium whose one side has been recorded is reversed to perform recording on the other side of the medium.

2. Related Art

A double-side printing apparatus is known as one type of double-side recording apparatus (for example, JP-A-2004-314505, JP-A-2006-188068, and the like). The double-side printing apparatus is provided with a reversing unit for reversing a paper after printing on the front side. After front-side printing is completed, the reversing unit reverses the paper such that the back side becomes the side to be recorded.

For example, the double-side printing apparatus described in JP-A-2004-314505 has a problem in that parts on a paper transport path may be contaminated by ink since a printed portion is not dried when the paper is reversed immediately after one side (or front side) of the paper is printed, or a problem in that image quality may be degraded when the printed front side of the paper is rubbed and a printed image is blurred. For this reason, in the printing apparatus described in JP-A-2004-314505, a waiting time (or drying time) is set for a waiting operation until ink of the printed image or the like is dried when the front and back sides of the paper are reversed after front-side printing. Thus, a reversing operation is configured to reverse the paper after the drying time is elapsed and the ink is sufficiently dried.

On the other hand, an ink jet type printing apparatus is provided with a maintenance device for protection and restoration such that nozzle ink of a recording head is not thickened. The maintenance device has a cap. In the recording head in a waiting state in which printing is not performed, its nozzle aperture plane is sealed with the cap. In order to prevent the nozzle ink from being thickened in a non-capping period, flushing is performed to periodically eject ink regardless of recording. Nozzle clogging can be prevented by exchanging (or replacing) the nozzle ink with new ink. The maintenance device is arranged at a one-end position (or home position) on a moving path of the recording head. In the waiting time, the recording head is moved to the home position to wait in a capping state. At the other-end position (or flushing position) facing the home position on the moving path of the recording head, a through hole is provided to flush ink droplets. Upon flushing, the recording head is moved to the flushing position to perform the flushing operation. In the printing apparatus, there is a model in which flushing to the cap is performed or a model in which two flushing positions are set at both ends on the moving path of the recording head. When the waiting operation is performed until the drying time is elapsed, the recording head waits at the one-end position on the moving path.

However, flushing is performed whenever a predefined time is elapsed, for example, in a range of 5 to 15 sec. When the drying time is relatively long (for example, 20 sec or more), flushing is periodically performed a number of times during a waiting interval. For this reason, there is a problem in that ink is wasted for a different purpose other than printing.

SUMMARY

An advantage of some aspects of the invention is to provide a double-side recording apparatus and a recording method thereof that can minimize wasteful liquid consumption of a recording section in a state of waiting for the initiation of recording on another side after a medium is reversed in the double-side recording apparatus in which a waiting time for drying of a recorded portion is set.

According to an aspect of the invention, there is provided a double-side recording apparatus including: a recording section that performs recording by ejecting liquid to a sheet-shaped medium; a reversing section that reverses front and back sides of the medium to perform recording on one side of the medium and recording on the other side of the medium; a capping section for capping the recording section; a determination section that determines whether a waiting time preset to cause recording to wait for drying exceeds a threshold value before a reversing operation by the reversing section is initiated after recording on the one side of the medium is completed; a moving section that moves the recording section to a first position where the liquid is periodically ejected regardless of recording by the recording section when capping is not performed and moves the recording section to a second position where the recording section is capped; and a controller that controls the moving section and the capping section such that the recording section waits at the first position without moving the recording section to the second position when the waiting time does not exceed the threshold value after the recording section completes recording on the one side of the medium, and the recording section waits in a state in which the capping section caps the recording section by moving the recording section to the second position when the waiting time exceeds the threshold value.

When the set waiting time does not exceed the threshold value after the recording section completes recording on the one side of the medium, the recording section is moved to the first position to wait at the first position. On the other hand, when the waiting time exceeds the threshold value, the recording section is moved to the second position to wait at the second position in the capping state. Consequently, when a relatively long waiting time exceeding the threshold value is set, a time of waiting increases until recording is initiated on the medium reversed to set the other side to the side to be recorded, but the recording section waits in the capping state, such that flushing is not performed during waiting. Therefore, wasteful liquid consumption by flushing can be minimized. On the other hand, when the waiting time is relatively short without exceeding the threshold value, a time of waiting is short until recording on the other side of the medium is initiated. Thus, even when the liquid is periodically ejected regardless of recording during waiting, the number of ejections in this time can be reduced to zero or the small number of times and wasteful liquid consumption from the recording section can be suppressed. In this case, since the capping operation is unnecessary, the number of operations to be performed is reduced until recording on the other side is initiated, such that recording on the other side can be initiated earlier than that in the case where the waiting time exceeds the threshold value.

In the recording apparatus of the invention, it is preferable that the first position and the second position are provided at both sides between which a recording region for recording to be performed by the recording section is interposed on a moving path of the recording section, and the controller controls the moving section to move the recording section from the second position to the first position after the reversing section starts to discharge the medium whose one side is completely recorded and before the medium reversed by the reversing section is completely refed, when the recording section waits at the second position.

When the recording section waits at the second position, the recording section is moved from the second position to the first position after the reversing section starts to discharge the medium whose one side is completely recorded and before the medium reversed by the reversing section is completely refed. Consequently, since this movement can be performed at a timing when the medium is not present at a position facing the moving path of the recording section, for example, when the recording section is to be moved to the first position serving as a recording start position where recording on the other side is initiated, there is no worry that the recording section is rubbed with the medium and the medium is contaminated. Of course, there can be considered that the recording section is moved from the second position to the first position after completing refeeding. In this case, a time of starting recording on the other side is delayed. On the other hand, in the invention, there is no worry that the medium is contaminated since the recording section can be moved from the second position to the first position when the medium is not present at a position facing the moving path of the recording section during the reversing operation. Moreover, the invention can avoid the delay of the time of starting recording on the other side.

In the recording apparatus of the invention, it is preferable that the reversing operation by the reversing section is divided into a discharge operation for discharging the medium to the reversing section and a refeed operation for refeeding the discharged medium from the reversing section to the recording section, the reversing section performs the discharge operation and the refeed operation when the waiting time is elapsed in a case where the recording section waits at the second position, and the controller causes the recording section to be moved from the second position to the first position after a time when the medium is not present at a position facing a moving path of the recording section in the discharge operation and before the medium reaches the position facing the moving path of the recording section in the refeed operation.

When the recording section waits at the second position, the reversing section continuously performs the discharge operation and the refeed operation if the waiting time is elapsed. At this time, the recording section is moved from the second position to the first position after a time when the medium is not present at the position facing the moving path of the recording section in the discharge operation and before the medium reaches the position facing the moving path of the recording section in the refeed operation. For this reason, there is no worry that the recording section moved from the second position to the first position is rubbed with the medium and the medium is contaminated during the discharge operation or the refeed operation.

In the recording apparatus of the invention, it is preferable that one of a setting state in which the waiting time is set and a non-setting state in which the waiting time is not set is selected, the waiting time is set when the setting state is selected, and the determination section determines that the waiting time exceeds the threshold value as the setting state is selected.

It is determined that the waiting time exceeds the threshold value from the setting state in which the waiting time is set. In the case of the setting state, the recording section waits at the second position in the capping state. In the case of the non-setting state, the recording section waits at the first position. Since there is a high possibility that the number of times of ejecting the liquid regardless of recording increases in the setting state compared with the non-setting state, the recording section waits in the capping state. Since only the setting state or the non-setting state is determined, the determination can be simplified.

According to another aspect of the invention, there is provided a recording method for use in a double-side recording apparatus having a recording section for performing recording by ejecting liquid to a sheet-shaped medium and a reversing section for reversing front and back sides of the medium to perform recording on one side of the medium and recording on the other side of the medium, including: determining whether a waiting time preset to cause recording to wait for drying exceeds a threshold value before a reversing operation by the reversing section is initiated after recording on the one side of the medium is completed; causing the recording section to wait at the first position without moving the recording section to the second position when the waiting time does not exceed the threshold value after the recording section completes recording on the one side of the medium and causing the recording section to wait in a capping state by moving the recording section to the second position when the waiting time exceeds the threshold value; and reversing the medium whose one side is completely recorded such that the other side is a side to be recorded and initiating the reversing operation after the waiting time is elapsed if the waiting time is set when the reversing operation is performed. Accordingly, the recording method has the same advantages as the above-described double-side recording apparatus.

In the recording method of the invention, it is preferable that the first position and the second position are provided at both sides between which a recording region for recording to be performed by the recording section is interposed on a moving path of the recording section, and the recording method further includes causing the moving section to move the recording section from the second position to the first position after the reversing section starts to discharge the medium whose one side is completely recorded and before the medium reversed by the reversing section is completely refed, when the recording section waits at the second position.

The recording section is moved from the second position to the first position after the reversing section starts to discharge the medium and before the medium reversed by the reversing section is refed. Thus, there is no worry that the recording section is rubbed with the medium and contaminates the medium in a moving process while the recording section is moved from the second position to the first position since the medium is not present at the position facing the moving path of the recording section.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
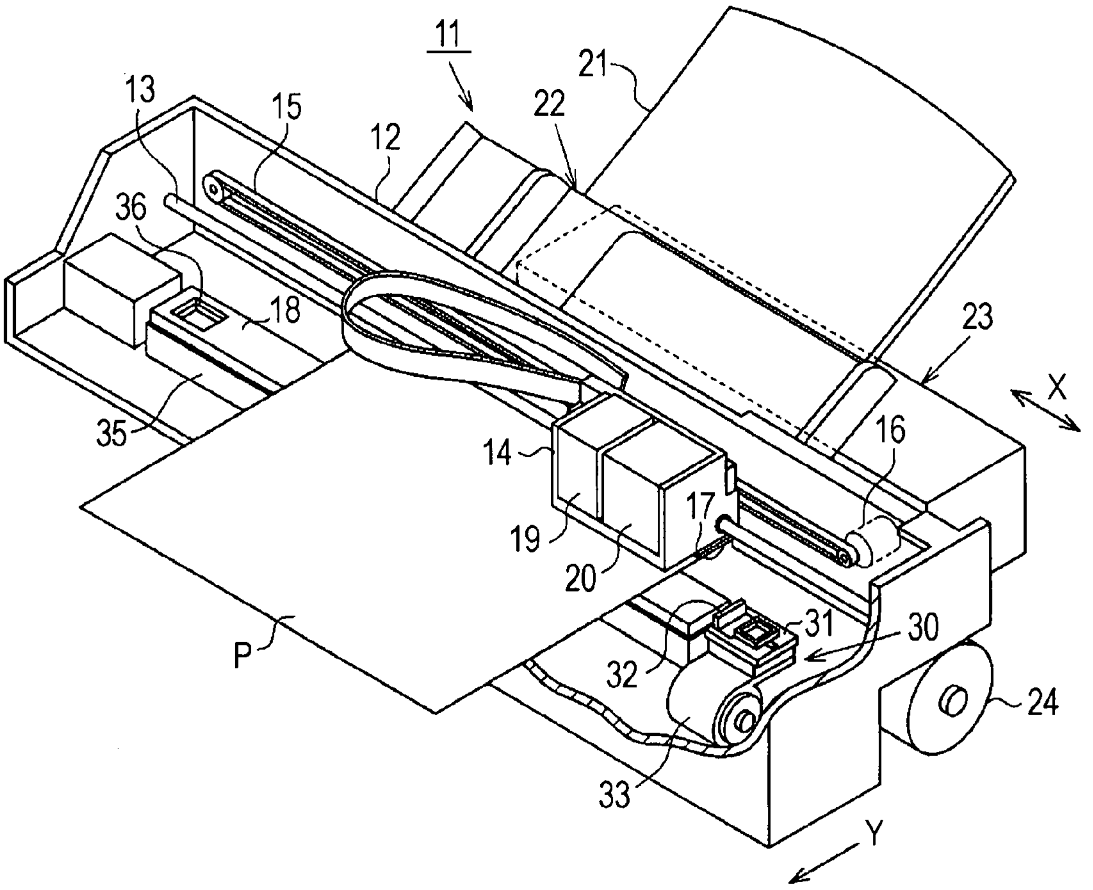
FIG. 1 is a perspective view of a double-side printing apparatus in accordance with an embodiment.
Figure 2:
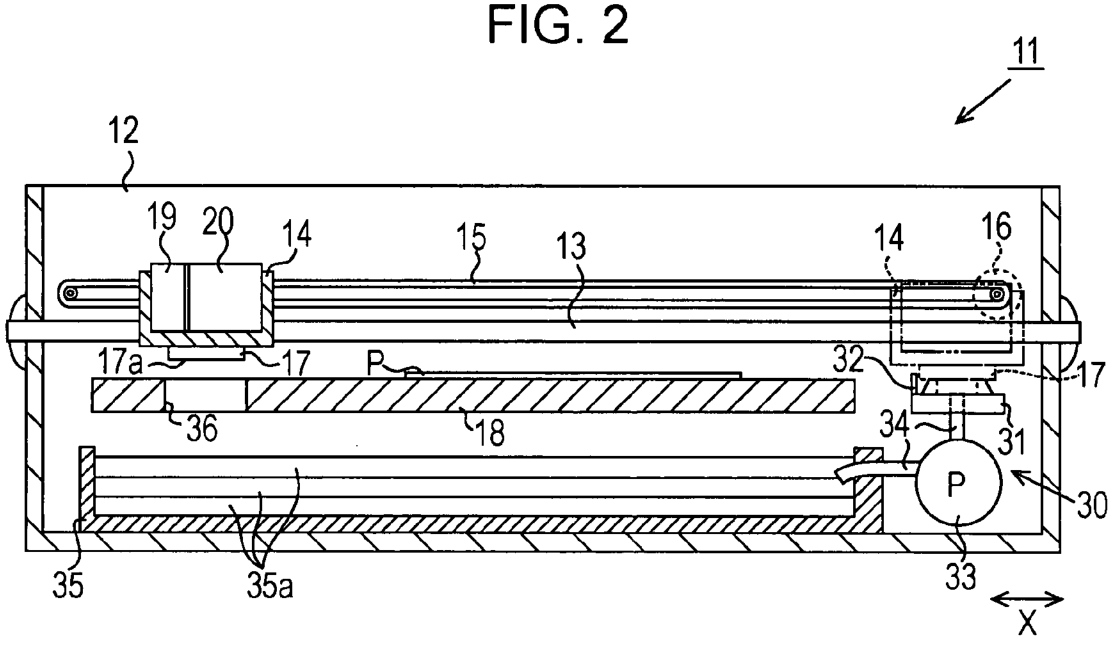
FIG. 2 is a schematic front cross-sectional view showing the double-side printing apparatus.

Hereinafter, an embodiment of a double-side printing apparatus in accordance with the invention will be described with reference to FIGS. 1 to 6. FIG. 1 is a perspective view of the double-side printing apparatus in accordance with the embodiment. FIG. 2 is a schematic front cross-sectional view showing the double-side printing apparatus.

As shown in FIG. 1, a double-side printing apparatus 11 serving as a recording apparatus includes a main body case 12 having an approximately bottom rectangular box shape. In the same drawing as that of the main body case 12, a guide shaft 13 having a predefined length is installed between left and right sidewalls. A carriage 14 is inserted through the guide shaft 13 and is provided to be movable in a shaft direction of the guide shaft 13. One position of the back surface of the carriage 14 is fixed to a predefined position of an endless timing belt 15 rotatably supported in a state in which the endless timing belt 15 is arranged in a main scanning direction X at the side of the back surface within the main body case 12. The carriage 14 is connected to a drive shaft of a carriage motor 16 through the timing belt 15 such that power transmission is possible. When the carriage motor 16 is rotated and driven, the timing belt 15 is rotated and driven. When the timing belt 15 is rotated and driven, the carriage 14 is reciprocated in the main scanning direction X.

A recording head 17 of an ink jet technique is provided below the carriage 14. The lower surface of the recording head 17 is a nozzle formation face 17*a* (see FIG. 2) in which multiple column nozzles for ejecting ink serving as liquid are open. At a position facing the recording head 17 within the main body case 12, a platen 18 is provided to regulate the spacing between the nozzle formation face 17*a* of the recording head 17 and a paper P. On an upper portion of the carriage 14, a black ink cartridge 19 for supplying ink and a color ink cartridge 20 individually accommodating inks of three colors of, for example, cyan, magenta, and yellow, are detachably loaded. The ink is supplied from the ink cartridges 19 and 20 to the recording head 17. The recording head 17 to which the ink is supplied from the ink cartridges 19 and 20 can eject (or discharge) the ink from each nozzle of the nozzle formation face 17*a*.

At the side of the back surface of the double-side printing apparatus 11, a paper supply tray 21 capable of staking a plurality of papers P is provided, and a paper supply unit (or automatic sheet feeder (ASF)) 22 is provided to separate only one uppermost sheet from the plurality of papers P stacked on the paper supply tray 21 and supply the separated sheet to a downstream side in an auxiliary scanning direction Y. In a rear portion below the paper supply unit 22, a reversing unit 23 is provided to reverse a paper P whose one side (or front side) has been printed and resupply the paper P in a direction in which the back side is set to the print side.

In a right lower portion in FIG. 1 showing the main body case 12, a paper feed motor 24 is arranged. As the paper feed motor 24 is driven, a paper feed roller 25 and a paper discharge roller 26 (see FIG. 4) provided before and after the recording header 17 are rotated and driven at positions between which the recording head 17 is interposed, thereby transporting the paper P in the auxiliary scanning direction Y. Recording (or printing) on the paper P is performed by alternately repeating an operation for ejecting ink from the nozzle formation face 17*a* of the recording head 17 to the paper P while reciprocating the carriage 14 in the main scanning direction X and an operation for transporting the paper P by a predefined transportation amount in the auxiliary scanning direction Y.

In this embodiment, the double-side printing apparatus 11 is provided with an automatic platen gap (APG) adjusting device (referred to as APG device) for vertically moving the carriage 14 to adjust the spacing (or platen gap) between the recording head 17 and the platen 18. The double-side printing apparatus 11 is configured to adjust a height of the carriage 14 by controlling an APG motor 68 (see FIG. 3) of the APG device and secure a predefined paper gap (or the spacing between the recording head and the paper) such that a proper platen gap based on a thickness of the paper P is secured from information regarding a type of the paper P acquired from a host computer or the like.

In FIG. 1, a right end on a moving path of the carriage 14 is a stop position out of a recording region where recording is performed, and is a home position of the carriage 14 in a waiting state when recording is not performed. When the carriage 14 is arranged at the home position, a maintenance unit 30 for cleaning the recording head 17 is arranged directly below the home position. The maintenance unit 30 is provided with a cap 31 of an approximately rectangular shape functioning as a cover for preventing ink within the nozzles of the recording head 17 from being dried, a wiper 32 for wiping the nozzle formation face 17*a*, and a suction pump 33 located adjacent to the cap 31. In a state in which the carriage 14 is moved and the recording head 17 is located directly above the cap 31, the APG motor 68 (see FIG. 3) is driven and the carriage 14 is lowered, for example, up to a lowest position, such that the nozzle formation face 17*a* is in close contact with the cap 31 to seal the nozzles.

In addition to a cover function (or capping function) for preventing the nozzle openings from being dried, the cap 31 also has a partial function of a liquid suction means for forcibly drawing and discharging ink from the recording head 17 by capping the nozzle formation face 17*a* of the recording head 17 and applying the negative pressure from the suction pump 33 to its sealed space. When the carriage 14 is arranged at the home position, the cap 31 is arranged in a height without interfering with the recording head 17. When the APG device is driven, the carriage 14 is lowered, such that the nozzle formation face 17*a* of the recording head 17*a* is in close contact with an upper end including a flexible member of the cap 31 and the nozzle openings of the nozzle formation face 17*a* are sealed (see FIG. 2).

The suction pump 33 is rotated and driven according to the paper feed motor 24 for the rollers 25 and 26 used to transport and discharge the paper P. For example, the suction pump 33 includes a tube pump, and one end of a tube 34 (see FIG. 2) wrapped around inside the tube pump is connected to the cap 31 and the other end is connected to a waste liquid tank 35 arranged below the platen 18. Both the ends of the tube externally extend.

The wiper 32 is located adjacent to a printing region at the cap 31. In a process in which the carriage 14 is moved from the home position from the printing region after the suction operation of the recording head 17 is completed, the nozzle formation face 17*a* is in sliding contact with the wiper 32, such that the nozzle formation face 17*a* is wiped.

In an end portion (or left end portion in FIG. 1) facing the home position of the platen 18, a through hole 36 vertically passing through the platen 18 is formed. A position of the carriage 14 arranged in a state in which the recording head 17 vertically faces the through hole 36 is set to a flushing position. Below the platen 18, the waste liquid tank 35 is arranged on the bottom of the main body case 12. The waste liquid tank 35 is formed in an approximately long rectangular box shape horizontally extending. As shown in FIG. 2, multiple ink absorbers 35*a* (or three ink absorbers in this embodiment) made of porous members having approximately long rectangular plate shapes are accumulated and accommodated in the waste liquid tank 35. Ink droplets ejected in a direction from the recording head 17 located at the flushing position to the through hole 36 are collected in the waste liquid tank 35 through the through hole 36.

Figure 4:
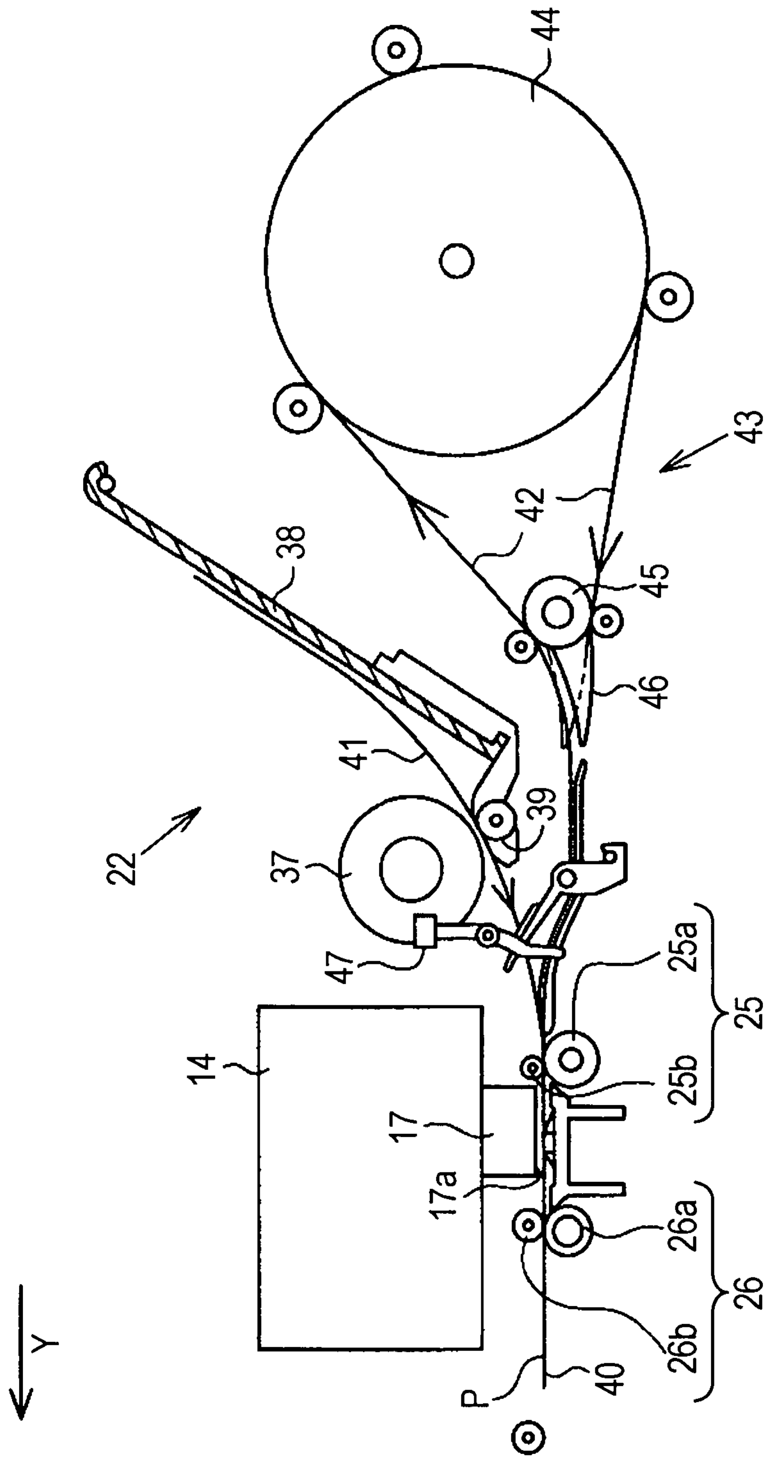
FIG. 4 is a schematic side view showing a carriage, a paper supply unit, and a reversing unit.

FIG. 4 is a schematic side view showing the paper supply unit or the reversing unit. The paper supply unit 22 includes a paper supply roller 37, a hopper 38 for biasing the paper P to the paper supply roller 37, and a retard roller 39 for separating the paper P by pressing the paper P with the paper supply roller 37. When the paper P is supplied, the paper P is pressed by the hopper 38 to the rotating paper supply roller 37 and is separated by the retard roller 39, such that only the paper P of one sheet is supplied.

The paper feed roller 25 and the paper discharge roller 26 between which the recording head 17 is interposed on a transport path from the paper supply unit 22 are respectively arranged before and after the recording header 17. The paper feed roller 25 includes a drive roller 25*a* and a driven roller 25*b*. After the paper P is supplied, the paper P is fed by a predefined pitch in a printing process. The paper discharge roller 26 includes a drive roller 26*a* and a driven roller 26*b*. The printed paper P is transported and discharged by the paper feed roller 25. Printing is performed by alternately repeating a printing operation for ejecting ink from the recording head 17 while the carriage 14 is moved in the main scanning direction and a transport operation for transporting the paper P by a predefined pitch whenever one line is printed. The paper feed roller 25 and the paper discharge roller 26 can transport the paper P in a forward feed direction and a reverse feed direction. The transport path in which the paper feed roller 25 and the paper discharge roller 26 transport the paper P is a common transport path 40 in which the paper P is commonly transported upon printing on the front side and printing on the back side. A paper-supply transport path 41 in the paper supply unit 22 joins the common transport path 40 before the recording head 17.

On the other hand, a reversing unit 43 having a reversing transport path 42 of a closed-loop shape is mounted in a triangle space below the hopper 38 constituting the paper supply unit 22. This reversing unit 43 has a large reversing roller 44 and a small reversing roller 45 separated from each other as shown in FIG. 4. The large reversing roller 44 and the small reversing roller 45 are rotatably supported by left and right frames (not shown) of the reversing unit 43. The reversing transport path 42 has a straight line connected between surfaces surrounding both the large reversing roller 44 and the small reversing roller 45 and a loop-shaped transport path along the surface surrounding the large reversing roller 44 continuous thereto. The reversing transport path 42 joins the common transport path 40 before the recording head 17.

In the reversing unit 43, a reversing flap 46 for changing a flow path of the paper P is provided at a leading end in which the small reversing roller 45 is arranged. The reversing flap 46 can switch the path to a receiving position and a discharge position. In the vicinity of the joining position of the paper-supply transport path 41 and the reversing transport path 42, a lever type paper detector 47 is provided which can detect an end of the paper at both the time of supplying the paper and the time of reversing and resupplying the paper.

The double-side printing apparatus 11 performs printing on the one side (or front side) of the paper P by forwardly feeding the paper P supplied from the paper supply unit 22 and passing through the paper P along the common transport path 40. The double-side printing apparatus 11 is configured to reversely feed the paper P whose one side has been printed, guide the paper P to the reversing transport path 42, forwardly refeeds the paper P reversed in the reversing transport path 42, transport the paper P to the common transport path 40, and print the back side in the recording head 17. A power transmission mechanism is provided to drive the reversing rollers 44 and 45 using drive power of the paper feed roller 25. According to the power transmission mechanism, the reversing rollers 44 and 45 are driven after the reversing operation is initiated after the front side is printed. The drive states of the reversing rollers 44 and 45 are at least maintained until the rear end of the paper P departs from the small reversing roller 45 when the back side is printed.

Figure 3:
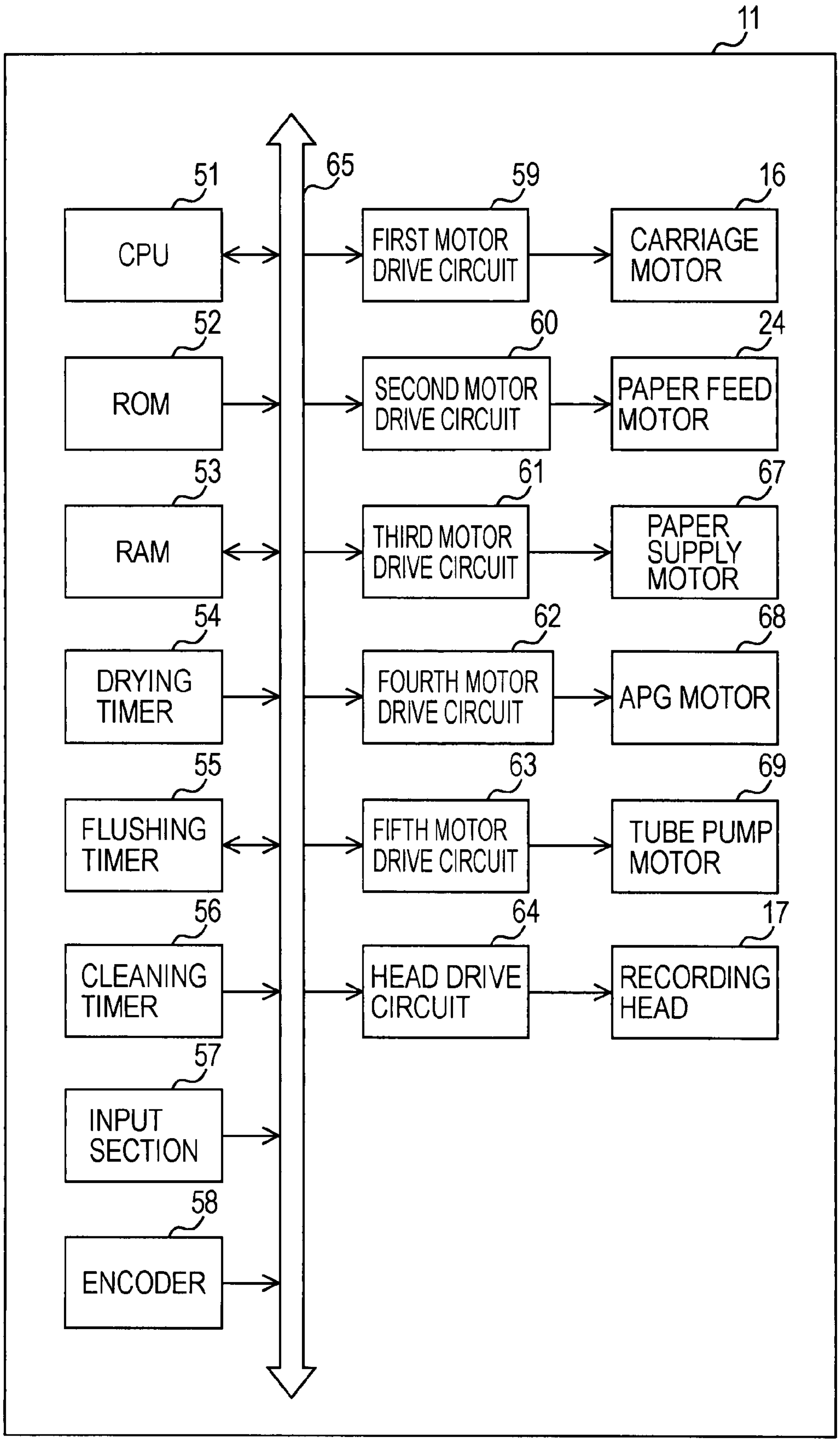
FIG. 3 is a block diagram showing an electrical configuration of the double-side printing apparatus.

FIG. 3 shows an electrical configuration of the double-side printing apparatus. In FIG. 3, the carriage motor 16 and the paper feed motor 24 as mentioned above are denoted by the same reference numerals. As shown in FIG. 3, the double-side printing apparatus 11 includes a central processing unit (CPU) (or controller) 51, a read only memory (ROM) 52, a random access memory (RAM) 53, a drying timer 54, a flushing timer 55, and a cleaning timer 56. The double-side printing apparatus 11 further includes an input section 55, an encoder 58 (or an linear encoder), a first motor drive circuit 59, a second motor drive circuit 60, a third motor drive circuit 61, a fourth motor drive circuit 62, a fifth motor drive circuit 63, and a head drive circuit 64. These are connected to each other via a bus 65.

The CPU 51 operates according to various programs stored in the ROM 52, and temporarily stores arithmetic processing results and the like in the RAM 53. In detail, the ROM 52 stores various programs including a flushing control program shown in the flowchart of FIG. 5 for controlling a flushing operation and a program shown in the flowchart of FIG. 6 for controlling a waiting position of the carriage when the paper is reversed according to a drying time serving as a waiting time after the front side is completely printed. A one-side print mode and a both-side print mode are selected by information acquired from print data.

The input section 57 is provided in a main body of the double-side printing apparatus 11. When a user manipulates the input section 57, the CPU 51 inputs data based on manipulation of the input section 57. The input section 57 is manipulated by the user when setting data such as a drying time and the like is input. The input section 57 includes an operation switch such as a selection switch, a decision switch, or the like. The drying time can be manually set by selecting a desired drying time based on manipulation of the input section 57 among options of a drying time setting menu displayed on a liquid crystal display section (not shown) provided in the main body of the double-side printing apparatus 11. The drying time capable of being set is predefined. For example, the drying time can be set in a unit of 5 sec in a range of from 5 sec to 60 sec. In this embodiment, the drying time can be automatically set in addition to manual setting selected by the user. In the case of automatic setting mode, the drying time is computed and set in a predefined rule based on print condition information acquired by the CPU 51 from the print data. For example, as in the printing apparatus described in JP-A-2004-314505, the drying time is computed and set in a predefined arithmetic expression according to an amount of ejected ink, an elapsed time from when ink is ejected, a type of ink, a type of paper, surrounding temperature, surrounding humidity, or the like. The input section 57 further includes various switches such as a power switch, a stop switch, and the like. In the case of manual setting, a setting means for setting the drying time is configured with the input section 57. On the other hand, in the case of the automatic setting mode, the setting means is configured with the CPU 51 for computing the drying time.

Although not shown, the encoder 58 has a tape in which a slit is formed in a longitudinal direction at a regular interval along the moving path of the carriage 14 and an optical sensor fixed at a predefined position of the carriage 14 in a state in which the slit of the tape can be detected. The optical sensor has a pair of a light emitting element and a light receiving element between which the tape is interposed. The light emitting element and the light receiving element are arranged to face each other. The light emitting element emits light and the light receiving element receives the light passed through the slit on the tape. Consequently, the encoder 58 outputs pulses having a cycle in inverse proportion to the moving speed of the carriage 14 with the number of pulses in proportion to the moving distance of the carriage 14. The CPU 51 has a position counter for counting the number of pulses in a state in which the home position of the carriage 14 is set to the origin point. Thus, a value of the position counter is incremented when the carriage 14 is moved in a direction away from the home position and is decremented when the carriage 14 is moved in a direction toward the home position. A position of the carriage 14 can be detected from a count value of the position counter. Consequently, the CPU 51 can detect that the carriage 14 is at the home position or the flushing position from the count value of the position counter.

The drying timer 54 counts a drying time manually set by manipulation of the input section 57 or an automatically set drying time. The set drying time is stored in a predefined region of the RAM 53. When the front side is completely printed, the CPU 51 is configured to read out data of the set drying time from a predefined storage region of the RAM 53, and cause the drying timer 54 to start to count the drying time.

The flushing timer 55 counts an elapsed time from when capping of the recording head 17 is released or an elapsed time from when a previous flushing operation is completed. When the counted time reaches a predefined time (or a waiting time for flushing), the flushing timer 55 notifies the CPU 51 that the predefined time (or the waiting time for flushing) is reached. When the recording head 17 is not in the capping state, there is a high possibility that an ejection error occurs since nozzle ink is thickened when ink is not ejected during more than a given time. For this reason, the predefined time (or the waiting time for flushing) is set to a regular time such that ink of all nozzles can be ejected every regular time regardless of printing in order to prevent the ejection error during printing. Herein, the predefined time is properly set according to a type of used ink (or a type of solvent or dispersion medium or a type of dye or pigment), a nozzle pore diameter, and used environments (or temperature and humidity) based on the tendency of nozzle clogging of the recording head 17. In this regard, it is preferable that the predefined time is set to a predefined value, for example, in a range of 3 to 30 sec, in order to properly prevent a recording error, although the predefined time depends on the above-described conditions. When the predefined time is less than 3 sec, the number of times of flushing increases, such that a required printing time increases. When the predefined time exceeds 30 sec, there is a worry that an ejection defect occurs since an amount of ink to be ejected is insufficient. In this embodiment, the predefined time (or the waiting time for flushing) is set to a predefined value, for example, in a range of 5 to 15 sec, such that this ejection error can be surely prevented.

Upon receiving a notification indicating that the predefined time has elapsed from the flushing timer 55, the CPU 51 moves the carriage 14 to the flushing position by driving the carriage motor 16. The CPU 51 causes ink droplets to be ejected from all nozzles of the recording head 17 by outputting an ejection drive signal to the head drive circuit 64 regardless of printing. The ink droplets ejected in this flushing operation are wasted to the through hole 26 (see FIGS. 1 and 2) located in the end portion facing the home position of the platen 18.

The cleaning timer 56 counts an elapsed time from a previous suction operation (or cleaning). When the elapsed time counted by the cleaning timer 56 exceeds a preset time (for example, several hours to several days) or power is first applied after the elapsed time, the CPU 51 performs the cleaning operation upon receiving the notification from the cleaning timer 56. That is, the CPU 51 moves the carriage 14 to the home position by driving the carriage motor 16 and caps the recording head 17 by driving the APG motor 68 to lower the carriage 14. Suction force acts in an internal space of the cap 31 by driving a tube pump motor 69 and pump-driving the suction pump 33, such that ink is forcibly drawn from the nozzles of the recording head 17.

The CPU 51 is connected to the carriage motor 16, the paper feed motor 24, the paper supply motor 67, the APG motor 68, and the tube pump motor 69 via the first to fifth motor drive circuits 59 to 63, and outputs a drive control signal for driving and controlling each motor.

When printing is initiated by receiving print data from the host computer, the CPU 51 transports the paper P to a print start position by driving the paper supply motor 67 and rotating the paper supply roller 37. At this time, a sub motor (not shown) is driven and the retard roller 39 and the hopper 38 located at a back-off position are respectively arranged at the paper supply position (or the position shown in FIG. 4). In a state in which the hopper 38 adsorbs the uppermost paper P to the paper supply roller 37 and the retard roller 39 is in contact with the surface surrounding the paper supply roller 37, the paper supply roller 37 starts to be rotated, such that only one uppermost sheet of papers P stacked on the hopper 38 is separated and supplied.

When the first page paper is supplied, a paper gap is adjusted before the print start (or feeding). That is, the height of the recording head 17 is position-adjusted by forwardly or reversely rotating and driving the APG motor 68 and lowering or raising the carriage 14 such that the paper gap is secured based on information included in print data (for example, a type of paper). After the paper gap is adjusted, the paper P is fed. In place of the gap adjustment based on the information included in the print data, the gap can be adjusted based on a measurement result obtained by measuring a thickness of the paper.

In the case where the nozzles of the recording head 17 are sealed with the cap 31 of the maintenance unit 30, the CPU 51 seals the nozzles of the recording head 17 with the cap 31 by forwardly rotating and driving the APG motor 68 to lower the carriage 14 upon detecting that the carriage 14 has been moved to the home position. When the cap 31 is taken off, the carriage 14 is raised by reversely rotating and driving the APG motor 68.

When the paper is supplied, fed, or discharged, the CPU 51 forwardly rotates and drives the paper feed motor 24. When the paper is reversed, the CPU 51 reversely rotates and drives the paper feed motor 24. The paper P is forwardly fed by forwardly rotating and driving the paper feed motor 24. The paper P is reversely fed by reversely rotating and driving the paper feed motor 24. Consequently, when the paper P is supplied, the paper P is forwardly fed up to a feeding position and is transported. The supplied paper P is forwardly fed while the front side of the paper P is printed. When the front side is completely printed, a reversing operation is performed to reverse the front and back sides of the paper P by reversely feeding the paper P. At this time, the paper P goes around the large reversing roller 44 and the reversing operation of the paper P is suspended before a leading end of the paper P reaches the common transport path 40. The reversing operation of the paper whose front side is completely printed is the front-side transport to a rear portion. Then, after detecting that the carriage 14 is arranged at the flushing position, the CPU 51 resupplies the paper P from the reversing transport path 42 to the common transport path 40 by forwardly rotating and driving the paper feed motor 24.

The CPU 51 is connected to the recording head 17 via the head drive circuit 64. A nozzle drive signal is output to an ejection drive element (not shown) (for example, a piezoelectric element) for ejecting ink from the nozzles provided in the recording head 17. The recording head 17 can be controlled in an application specific integrated circuit (ASIC) (or an integrated circuit (IC) for a specific purpose).

Figure 5:
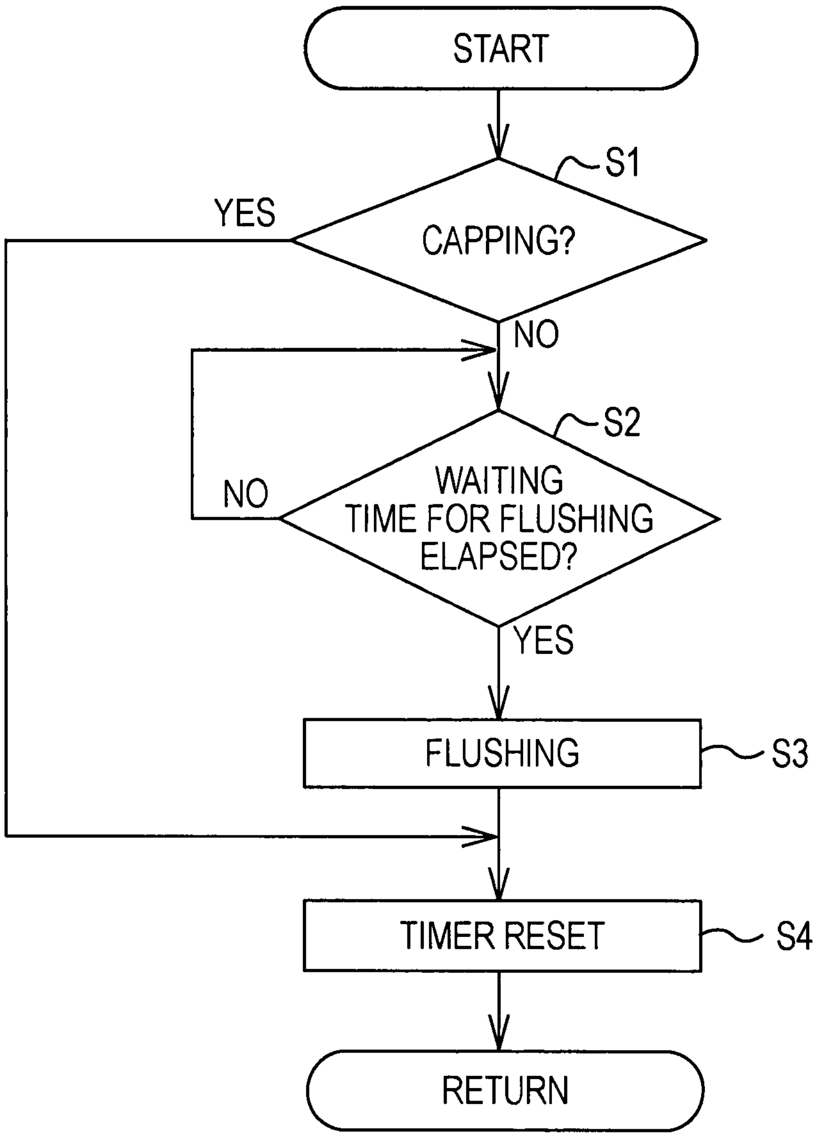
FIG. 5 is a flowchart showing a flushing control processing routine.

Next, a flushing control processing routine to be executed in the CPU 51 will be described with reference to FIG. 5. When the flushing control processing routine is executed, the CPU 51 determines whether capping is in progress (S1). When capping is in progress, it is determined that the counter for managing the position of the carriage 14 has a value of the home position and the counter for managing a drive position of the APG motor 68 has a value of the capping position (or the lowest position in this embodiment). When capping is in progress (YES in S1), the flushing timer 55 is reset (S4).

When capping is not in progress (NO in S1), it is determined whether a notification indicating that the waiting time for flushing has elapsed is received from the flushing timer 55 (S2). When the notification is received (YES in S2), flushing is performed (S3). After flushing is completed, the flushing timer 55 is reset and is set to zero (S4). When the notification indicating that the waiting time for flushing has elapsed is not received (NO in S2), a waiting operation is performed until the waiting time for flushing is elapsed.

Figure 6:
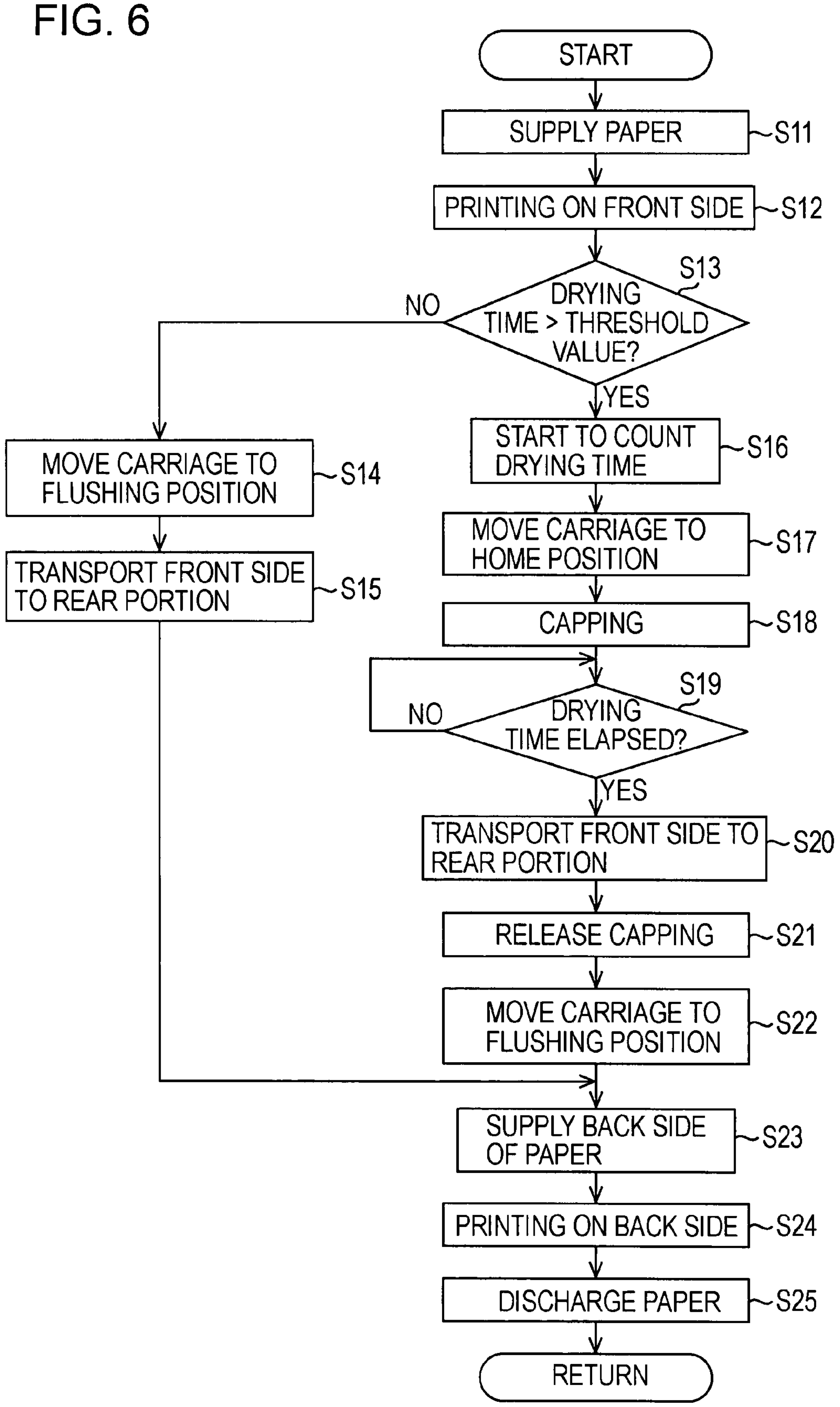
FIG. 6 is a flowchart showing a both-side print processing routine.

Next, a both-side print processing routine to be executed when the CPU 51 performs the both-side print mode will be described with reference to FIG. 6. The CPU 51 receives print data from the host computer and detects whether command content is the one-side print or the both-side print from the print data. When the command content is the both-side print, the both-side print processing routine shown in FIG. 6 is executed in the both-side print mode.

First, the CPU 51 detects the print start position from the print data and supplies the paper P such that the paper P is fed to the print start position (S1). That is, the hopper 38 and the retard roller 39 are arranged at a paper supply position by driving the sub motor, and the paper supply roller 37 is rotated and driven by driving the paper supply motor 67. As a result, the paper P stacked on the hopper 38 is adsorbed to the surface surrounding the paper supply roller 37. The one uppermost paper P is supplied via the paper-supply transport path 41 by rotating and driving the paper supply roller 37. When the paper detector 41 detects the leading end of the paper P while the paper is supplied, the CPU 51 counts drive pulses of the paper feed motor 24 (or the paper supply motor 67) from the detection position. When the count value reaches a predefined value corresponding to a distance from the detection position to the print start position, the paper feed roller 24 is stopped. As a result, the paper P entering the common transport path 40 through the paper-supply transport path 41 is fed to the print start position.

When the paper P is completely supplied, the CPU 51 controls the carriage motor 16, the recording head 17, and the paper feed motor 24, such that the front side of the paper P is printed (S2). That is, printing is performed by alternately repeating a printing operation for performing printing on the side of the paper P to be printed by ejecting ink from the recording head 17 while moving the carriage 14 in the main scanning direction X and a paper feed operation for feeding the paper P by a predefined paper feed amount.

When the front side is completely printed, it is determined whether the drying time exceeds the threshold value (S13). In this embodiment, it is determined that the drying time exceeds the threshold value when the drying time is set and that the drying time does not exceed the threshold value when the drying time is not set. In detail, this determination is made by checking a drying time setting flag for managing the presence of setting of the drying time. For example, when the drying time setting flag is set to "1", it is determined that the drying time exceeds the threshold value. When the drying time setting flag is set to "0", it is determined that the drying time does not exceed the threshold value. Of course, a method can be adopted in which a time shorter than the shortest time capable of being set as the drying time is set to the threshold value (for example, 4 sec), data of the set drying time is read out from the RAM 53, and it is determined whether the drying time exceeds the threshold value. This determination method can be a method for comparing the drying time and the threshold value and a determination method based on a flag or the like for indirectly obtaining a result of determining whether the drying time exceeds the threshold value. When the drying time and the threshold value are compared, the determination can be made even when the threshold value is set to zero.

When the drying time is not set (or is set to "0 sec") and does not exceed the threshold value (NO in S13), the carriage 14 is moved to the flushing position (S14). In a state in which the carriage 14 waits at the flushing position, the front-side transport to the rear portion (S15) and the back-side supply (S23) are sequentially performed. In an operation for reversing the paper P after the front side is completely printed, the front-side transport to the rear portion (or the discharge operation) is performed to transport the paper P to the reversing unit 43 of the rear portion in a state in which the front side is toward the recording side, and the back-side supply (or the paper resupply operation) is performed to resupply the paper P reversed by the reversing unit 43 in a direction in which the back side is toward the recording side. In a state in which the carriage 14 waits at the flushing position, the front-side transport to the rear portion and the back-side supply are continuously performed. That is, when the front-side transport to the rear portion is performed by reversely rotating and driving the paper feed motor 24 and the paper P is completely transported up to a predefined position of the reversing unit 43, the reverse-rotation drive of the paper feed motor 24 is stopped. Continuously, the paper feed motor 24 is forwardly rotated and driven and the back-side supply is performed.

Thus, printing on the back side of the paper P according to the back-side supply is performed (S24). In back-side printing like front-side printing, the carriage motor 16, the recording head 17, and the paper feed motor 24 are controlled. The printing operation and the paper feed operation are alternately performed. After the back side is completely printed, the paper P is discharged (S25). That is, the paper P is discharged to a paper discharge outlet of the front portion by forwardly rotating and driving the paper feed motor 24 to rotate the paper feed roller 25 and the paper discharge roller 26.

While the carriage 14 waits at the flushing position, the CPU 51 executes the flushing control processing routine and performs the flushing operation for ejecting ink droplets from the nozzles of the recording head 17 whenever the waiting time for flushing is elapsed. In this regard, when a time of waiting for drying is absent, the operation for reversing the front and back sides of the paper P is completed in a relatively short time and flushing is performed only once. When a time required for reversing the front and back sides is set to, for example, 3 sec, after the front side is completely printed and the waiting time for flushing is set to, for example, 10 sec, back-side printing can be initiated by completing the paper reversing operation (of 3 sec) before the next flushing operation (or before the waiting time for flushing (of 10 sec) expires), for example, if the front side is completely printed immediately after flushing is performed. In this case, the number of times of flushing to be performed in the waiting state until the next back-side printing operation is initiated is set to "0". When front-side printing is completed immediately before the waiting time for flushing expires, the flushing operation is performed once in the waiting state until back-side printing is initiated.

On the other hand, when the drying time is set, it is determined that the drying time exceeds the threshold value after front-side printing (S12) is completed (YES in S13). On the basis of this determination result, the drying timer 54 starts to count the drying time (S16). The carriage 14 is moved to the home position by driving and controlling the carriage motor 16 (S17). Upon detecting that the carriage 14 has reached the home position, capping is performed (S18). That is, the CPU 51 causes the carriage 14 to be lowered to the lowest position by forwardly rotating and driving the APG motor 68. When the carriage 14 reaches the home position, the carriage 14 is lowered to the lowest position as shown in the dashed-two dotted line of FIG. 2, and the recording head 17 is capped with the cap 31. In the capping state, the carriage 14 waits for the lapse of drying time.

The CPU 51 determines whether the drying time is elapsed (S19). In other words, it is determined whether the drying timer 54 counts the drying time. When the drying time is not elapsed, the waiting operation is performed until the drying time is elapsed. Upon determining that the drying time is elapsed, the front-side transport to the rear portion is performed (S20). Then, capping is released (S21). That is, the carriage 14 is raised to a position where a predefined paper gap from the front side of the paper P is ensured by forwardly rotating and driving the APG motor 68. When capping is released, flushing is performed once. This flushing operation is performed by ejecting the ink droplets to the cap 31. Of course, when capping is released, the flushing operation can be disabled if it is ensured that the ink droplets are surely ejected.

After capping is released, the carriage 14 is moved to the flushing position (S22). That is, the CPU 51 moves the carriage 14 from the home position to the flushing position of an opposite side on the moving path. In this embodiment, this is because the flushing position becomes an initial position of the recording head 17 when back-side printing is initiated. Next, the back-side supply is performed (S23). That is, the CPU 51 resupplies and feeds, to the common transport path 40, the paper P transported by the reversing unit 43 to a predefined position by forwardly rotating and driving the paper feed motor 24. During this back-side supply (or paper resupply), the leading end of the paper P is detected by the paper detector 47, and drive pulses of the paper feed motor 24 are counted from the detection position. When a count value reaches a value of the print start position, the paper feed motor 24 is stopped. The speed reduction is initiated from a speed reduction position before a predefined distance of the stop position. While the paper P is speed-reduced, the paper P stops at the print start position.

A sequence of the front-side transport to the rear portion (S20) and the back-side supply (S23) and a sequence of the capping release (S21) and the carriage movement (S22) are separately performed. Thus, when the sequence of the front-side transport to the rear portion is initiated, the sequence of the capping release and the carriage movement is initiated without waiting for the sequence of the front-side transport to the rear portion to be terminated. At this time, the movement of the carriage 14 from the home position to the flushing position is performed after a timing when the paper P started to be discharged to the reversing unit 43 in the front-side transport to the rear portion is not present at a position facing the moving path of the recording head 17 and before a timing when the paper P whose back side has been supplied reaches the position facing the moving path of the recording head 17. As a result, while the carriage 14 is moved from the home position to the flushing position, the recording head 17 does not contaminate the paper P without being rubbed with the paper P when the paper P is being discharged to the reversing unit 43 and when the paper P is being resupplied from the reversing unit 43.

After the back-side supply, back-side printing is performed (S24). The carriage 14 initiates back-side printing from the flushing position. In back-side printing like front-side printing, the printing operation and the paper feed operation are alternately performed by controlling the carriage motor 16, the recording head 17, and the paper feed motor 24. When back-side printing is completed, the paper P whose back side has been printed is discharged (S25).

The CPU 51 executes the flushing control processing routine even when the carriage 14 waits at the home position in the capping state. However, flushing is not periodically performed since capping is in progress (S1 in FIG. 5). Since there is a waiting time for drying, it is time-consuming to complete an operation for reversing the front and back sides of the paper P. During the time of waiting for the operation for reversing the front and back sides to be completed, only one flushing operation is performed when capping is released.

For example, in the case where the carriage 14 is configured to wait at the flushing position even when waiting for drying, flushing is performed whenever the waiting time for flushing (for example, 10 sec) is elapsed. For example, three flushing operations are performed in the waiting state when the drying time is 30 sec, and six flushing operations are performed in the waiting state when the drying time is 60 sec. On the other hand, in this embodiment in which the waiting operation is performed in the capping state, flushing is completed in one operation even when the drying time is 60 sec.

As described above, this embodiment has the following advantages.

(1) When the drying time is determined not to exceed the threshold value and the waiting time for drying is short, the carriage 14 waits at the flushing position while the paper P is reversed. Since the waiting time is short even when the carriage 14 waits at the flushing position, the number of times of flushing to be performed by the recording head 17 can be set to "0" or "1" while it waits for the next back-side printing operation to be initiated. When the drying time exceeds the threshold value and the waiting time for drying is relatively long, the carriage 14 is moved to the home position and the recording head 17 waits in the capping state. Flushing is not periodically performed during capping. When capping is released, only one flushing operation is performed. Accordingly, wasteful ink consumption for a different purpose other than printing can be minimized.

(2) After the paper P is discharged to the reversing unit 43 when capping is performed, the carriage 14 (or the recording head 17) is moved from the home position to the flushing position. After the carriage 14 is completely moved to the flushing position, the back-side supply (or paper resupply) is performed. Consequently, there is no worry that the recording head 17 on the move is rubbed with the paper P while the back-side supply is in progress and the paper P is contaminated. It can be understood that the recording head 17 can be prevented from being rubbed with the paper P in a resupply state by moving the recording head 17 after completing the reversing operation and stopping the paper P. However, in this case, the back-side printing start is delayed due to a required movement time of the recording head 17. On the other hand, this embodiment is configured to return the recording head 17 from the home position to the flushing position using the timing of the gap between the paper discharge operation and the resupply operation. Consequently, since the reversing operation is not forcibly suspended on the way until the recording head 17 is completely moved, the back-side printing start is not delayed.

(3) Since it is determined whether the drying time exceeds the threshold value by determining whether the drying time is set or not set, a process for comparing with the threshold value by reading out setting data of the drying time is not required, such that a determination process by the CPU 51 is completed without heavy burden.

The invention is not limited to each embodiment as described above, and the following forms can be adopted.

MODIFIED EXAMPLE 1

A method of determining a waiting position of the carriage 14 using the drying time in the above-described embodiment is not limited to the above-described embodiment. Other determination conditions can be added. For example, when an operation for waiting at the flushing position is selected by detecting a time counted by the flushing timer and employing the counted time and the waiting time until back-side printing is initiated, a determination method of selecting an operation of waiting in the capping state in which flushing is completed in one operation can be adopted in the case where at least two flushing operations are estimated to be performed.

MODIFIED EXAMPLE 2

In the above-described embodiment for determining whether there is a setting state in which the drying time is set or a non-setting state in which the drying time is not set, a corresponding determination is made when the threshold value (for example, 4 sec or zero sec) is set to be less than the shortest time (for example, 5 sec) in a range in which the drying time can be set. Alternatively, the threshold value can be set to be more than the shortest time in the range in which the drying time can be set. For example, the threshold value can be set to the shortest setting time (for example, 5 sec) or a middle value in the range in which the drying time can be set (that is, a value more than the shortest setting time (for example, 5 sec) and less than the longest setting time (for example, 60 sec), for example, 10 sec or 20 sec.

MODIFIED EXAMPLE 3

In the above-described embodiment, the flushing position is located in an opposite side in the carriage movement direction in which the printing region is interposed with respect to the home position. Alternatively, the flushing position can be set in the vicinity of the home position. A position where ink droplets are discharged upon flushing is not limited to the through hole on the platen 18. Alternatively, flushing to the cap 31 can be configured. In this case, the flushing position is in the vicinity of the home position, but capping and non-capping are classified according to whether the drying time exceeds the threshold value.

MODIFIED EXAMPLE 4

The above-described embodiment is configured to cap the recording head 17 by moving the carriage 14 to the platen 18 using the APG device. Alternatively, the maintenance unit can be configured to have a mechanism for moving the cap. The cap moving mechanism can be configured with power of an electric motor and can be configured with power pushing a lever when the carriage 14 is moved to the home position. In the latter case, the cap body can slide according to an oblique-shaped guide path and the cap can be raised when the carriage 14 pushes the lever. When the carriage 14 is away from the home position, the cap can be lowered by the return force of a spring.

MODIFIED EXAMPLE 5

The above-described embodiment is the double-side printing apparatus provided with the reversing unit 43 for reversing the paper such that the common recording head 17 performs recording on the front and back sides of the paper. The invention is not limited thereto. For example, the invention can be applied to the double-side printing apparatus as described in JP-A-2006-188068. In this case, two recording heads for front-side printing and back-side printing are respectively arranged at an upper stage and a lower stage. When back-side printing is completed by the recording head therefor, the paper is transported while being reversed from a transport path of the upper stage to a transport path of the lower stage. Recording on the back side is performed in the transport path of the lower stage. In this configuration, both-side printing can be performed on a continuous form paper as well as a cut-sheet paper. When the reversing operation is performed after drying the printed side by setting the drying time upon both-side printing, wasteful ink consumption for a different purpose other than printing based on flushing can be minimized.

MODIFIED EXAMPLE 6

In the above-described embodiment, position control of the carriage in the waiting time for drying is realized with software by running a program in the CPU 51. Alternatively, for example, the position control can be realized with hardware based on a control circuit (custom IC or the like), and can be realized with a cooperation of software and hardware.

MODIFIED EXAMPLE 7

The above-described embodiment is applied to a serial printer for performing printing by alternately performing the printing operation and the paper feed operation. The invention is not limited thereto and can be applied to a page printer. Of course, the invention can be applied to a laser printer, but is not limited thereto. The invention can be applied to an ink jet type double-side printing apparatus having a line head type recording head with nozzles across a total region of a maximum paper width. The invention is not limited to the ink jet printer, and can be applied to a dot impact type printer.

MODIFIED EXAMPLE 8

In the above-described embodiment, the double-side recording apparatus has been embodied as an ink jet type printer. Alternatively, the invention can also be applied to another liquid ejection type double-side recording apparatus for ejecting liquid other than ink. Herein, "recording" is not limited to recording based on printing. For example, "recording" includes an operation for forming and recording a wiring pattern on a substrate serving as a medium by ejecting a liquid-state material including a material available in the wiring pattern of a circuit or the like. For example, there can be provided a liquid ejection apparatus (or double-side recording apparatus) for ejecting liquid in which an used material such as an electrode material or color material used to manufacture a liquid crystal display, an electro luminescent (EL) display, a surface-emitting display, or the like is dispersed or dissolved and recording a circuit or element on a substrate serving as a medium.

MODIFIED EXAMPLE 9

When the drying time is not set (for example, the drying time of "0 sec") and the drying time does not the threshold value (NO in S13) in the above-described embodiment, the carriage 14 is moved to the flushing position (S14), but the recording section can be moved to a position other than the flushing position. The carriage can wait at a stop position after printing without moving to a specific position. An activation position of the carriage for printing or the like can be considered as a position other than the flushing position.

Hereinafter, technical ideas capable of being understood from the embodiment and the modified examples will be described.

(1) In the double-side recording apparatus according to claim 1, the first position and the second position are provided at both sides between which a recording region for recording to be performed by the recording section is interposed on a moving path of the recording section.

(2) In the double-side recording apparatus according to the technical idea (1), the first position is a position where the recording section is located when recording on the other side is initiated.

(3) The double-side recording apparatus according to any one of claims 1 to 4 and the technical ideas (1) and (2) further includes a setting section that sets a waiting time in which recording waits for drying before a reversing operation by the reversing section is initiated after recording on the one side of the medium is completed.

(4) In the double-side recording apparatus according to the technical idea (3), an interval time (of a waiting time for flushing in the embodiment) in which liquid is ejected regardless of recording is shorter than a maximum value of the waiting time capable of being set by the setting section.

(5) In the double-side recording apparatus according to any one of claims 1 to 4 and the technical ideas (1) to (4), the controller controls ejection of liquid for recording by the recording section and ejection of liquid regardless of recording.

(6) The recording method for use in the double-side recording apparatus according to claim 4 further includes setting a waiting time in which recording waits for drying before a reversing operation by the reversing section is initiated after recording on the one side of the medium is completed, before determining.

What is claimed is:

1. A double-side recording apparatus comprising:

a recording section that performs recording by ejecting liquid onto a sheet-shaped medium;

a reversing section that reverses the medium after the recording section performs recording on one side of the medium;

a capping section that caps the recording section;

a moving section that moves the recording section to a second position where the recording section is capped by the capping section and a first position other than the second position, wherein the first position is a flushing position; and a controller that controls the moving section, wherein:

the controller determines whether a waiting time set to cause recording to wait for drying before a reversing operation is initiated after recording on the one side of the medium is completed exceeds a threshold value, when the waiting time does not exceed the threshold value, the controller controls the moving section after the recording section completes recording on the one side of the medium to cause the recording section to wait at the first position without moving the recording section to the second position, and when the waiting time exceeds the threshold value, the controller controls the moving section to cause the recording section to wait in a capping state by moving the recording section to the second position, such that one and only one flushing operation is performed during the waiting time.

2. The double-side recording apparatus according to claim 1, wherein the first position and the second position are provided at opposed ends of a moving path of the recording section, between which a recording region for recording to be performed by the recording section is interposed, and the controller controls the moving section to move the recording section from the second position to the first position after the reversing section starts to discharge the medium whose one side is completely recorded and before the medium reversed by the reversing section is completely refed, when the recording section waits at the second position.

3. The double-side recording apparatus according to claim 1, wherein the reversing operation by the reversing section is divided into a discharge operation for discharging the medium to the reversing section and a refeed operation for refeeding the discharged medium from the reversing section to the recording section, the reversing section performs the discharge operation and the refeed operation when the waiting time is elapsed in a case where the recording section waits at the second position, and the controller causes the recording section to be moved from the second position to the first position after a time when the medium is not present at a position facing a moving path of the recording section during the discharge operation and before the medium reaches the position facing the moving path of the recording section during the refeed operation.

4. A recording method executed using a microprocessor in a double-side recording apparatus having a recording section for performing recording on a sheet-shaped medium and a reversing section for reversing the medium after the recording section performs recording on one side of the medium, comprising:

determining whether a waiting time set to cause recording to wait for drying before a reversing operation is initiated after recording on the one side of the medium is completed exceeds a threshold value;

when the waiting time does not exceed the threshold value, causing the recording section to wait at a predefined position after the recording section completes recording on the one side of the medium, without moving the recording section to a position where the recording section is capped;

when the waiting time exceeds the threshold value, causing the recording section to wait in a capping state by moving the recording section to the position where the recording section is capped; and reversing the medium whose one side is completely recorded such that an opposite side of the medium can be recorded and initiating the reversing operation after the waiting time is elapsed if the waiting time is set when the reversing operation is performed;

wherein the predefined position is a flushing position and wherein one and only one flushing operation is performed during the waiting time.

* * * * *